US008811228B2

(12) United States Patent  
Lopez et al.

(10) Patent No.: US 8,811,228 B2  
(45) Date of Patent: Aug. 19, 2014

(54) FULLY QUALIFIED DOMAIN NAME (FQDN) RECORD OPTIMIZATION FOR NETWORK NODE SELECTION

(75) Inventors: Javier M. Lopez, Alameda, CA (US); Emerando M. Delos Reyes, Pleasant Hill, CA (US); Imtiyaz Shaikh, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 364 days.

(21) Appl. No.: 13/274,460

(22) Filed: Oct. 17, 2011

(65) Prior Publication Data

US 2013/0094395 A1  Apr. 18, 2013

(51) Int. Cl.  
*H04L 12/28* (2006.01)  
*H04L 29/12* (2006.01)

(52) U.S. Cl.  
CPC ...... *H04L 29/12066* (2013.01); *H04L 61/1511* (2013.01)  
USPC ........................................................ 370/254

(58) Field of Classification Search  
CPC .................... H04L 61/1511; H04L 29/12066; H04L 61/3075; H04W 48/00  
USPC ........................................................ 370/254  
See application file for complete search history.

(56) References Cited

U.S. PATENT DOCUMENTS

| | | | |
|---|---|---|---|
| 7,573,903 B2 * | 8/2009 | Miyata et al. | 370/466 |
| 8,554,933 B2 * | 10/2013 | Delos Reyes et al. | 709/229 |
| 2005/0015761 A1 * | 1/2005 | Chang et al. | 717/174 |
| 2006/0031382 A1 * | 2/2006 | Pradhakar et al. | 709/217 |
| 2008/0147659 A1 * | 6/2008 | Chen et al. | 707/7 |
| 2010/0281151 A1 * | 11/2010 | Ramankutty et al. | 709/223 |
| 2010/0296445 A1 * | 11/2010 | Sarikaya et al. | 370/328 |
| 2010/0312875 A1 * | 12/2010 | Wilerson et al. | 709/224 |
| 2011/0096750 A1 * | 4/2011 | Velandy et al. | 370/331 |
| 2013/0121298 A1 * | 5/2013 | Rune et al. | 370/329 |

\* cited by examiner

*Primary Examiner* — Brandon Renner  
*Assistant Examiner* — Faisal Choudhury

(57) ABSTRACT

A device provides, to a domain name system (DNS), a request for candidate network nodes to which to connect, and receives, from the DNS and based on the request, a list of fully qualified domain names (FQDNs) for the candidate network nodes. The device truncates the FQDNs in the list of FQDNs to create a list of truncated FQDNs corresponding to the candidate network nodes, and stores the list of truncated FQDNs in a buffer associated with the device.

21 Claims, 8 Drawing Sheets

FULLY QUALIFIED DOMAIN NAME (FQDN) RECORD OPTIMIZATION FOR NETWORK NODE SELECTION

BACKGROUND

As wireless network data rates improve using third generation (3G), fourth generation (4G), and WiFi technologies, more and more bandwidth-intensive applications are being developed. A 4G wireless network is an all Internet protocol (IP) wireless network in which different advanced multimedia application services (e.g., voice over IP (VoIP) content, video content, etc.) are delivered over IP. 4G wireless networks include a radio access network (e.g., a long term evolution (LTE) network or an enhanced high rate packet data (eHRPD) network) and a wireless core network (e.g., referred to as an evolved packet core (EPC) network). The LTE network is often called an evolved universal terrestrial radio access network (E-UTRAN). The EPC network is an all-IP packet-switched core network that supports high-speed wireless and wireline broadband access technologies. An evolved packet system (EPS) is defined to include the LTE (or eHRPD) network and the EPC network.

A typical LTE network includes an eNodeB (eNB) and network nodes, such as a mobility management entity (MME), a serving gateway (SGW), and a packet data network (PDN) gateway (PGW). User equipment (UE) may connect to an appropriate eNB in a LTE network based on signal strength. The eNB forwards a request to the MME to select a SGW and a PGW, as well as a backup SGW and a backup PGW, based on querying a domain name system (DNS) that is manually configured with static mappings.

The MME utilizes recursive DNS queries to select the closest (e.g., based on physical distance) or most appropriate network nodes (e.g., SGW and PGW) to serve the UE. The DNS is provided in the network architecture to manage an addition or a change of these network nodes from the network. The Third Generation Partnership Project (3GPP) defines a format of a fully qualified domain name (FQDN) record to be used by the MME for the network node selection process. For example, the 3GPP states that the home network realm/domain shall be in the form of:

epc.mnc<MNC>.mcc<MCC>.3gppnetwork.org, where the <MNC> and <MCC> fields correspond to a Mobile Network Code (MNC) and a Mobile Country Code (MCC) of an operator's public land mobile network (PLMN). Both the <MNC> and <MCC> fields are three digits long. If the MNC of the PLMN is two digits, then a zero may be added at the beginning. An example FQDN record may include the following format:

topon.lb1.PGW01.HLLS.SA001.WE.node.
epc.mncXXX.mccXXX.3gppnetwork.org.

Currently, the MME can only store a limited number of FQDN records having such formats. The limited storage capability of the MME limits the number of FQDN records from which the MME may select. Accordingly, the limited storage capability of the MME limits a number of network nodes from which the MME may select for communication sessions with UEs.

DETAILED DESCRIPTION OF PREFERRED EMBODIMENTS

The following detailed description refers to the accompanying drawings. The same reference numbers in different drawings may identify the same or similar elements.

Systems and/or methods described herein may provide FQDN record optimization for selection of network nodes, such as LTE network nodes (e.g., a MME, a SGW, a PGW, etc.). The systems and/or methods may truncate redundant information included in the FQDN records before storing the FQDN records in a buffer. This may enable the systems and/or methods to store more FQDN records, which may increase a number of network nodes from which the systems and/or methods may select for communication sessions with UEs.

In one example implementation, a MME device may provide a request for candidate network nodes to a DNS, and may receive, from the DNS and based on the request, a list of FQDNs for network nodes. The MME device may truncate the FQDNs in the list of FQDNs to create a list of truncated FQDNs for the network nodes, and may store the list of truncated FQDNs in a buffer. The MME device may select a network node truncated FQDN from the list of truncated FQDNs, and may restore a FQDN of the selected network node truncated FQDN. The MME device may provide the restored FQDN of the selected network node to the DNS, and may receive, from the DNS, an IP record of the selected network node based on the restored FQDN. The MME device may connect with the selected network node based on the received IP record.

As used herein, the terms "subscriber" and/or "user" may be used interchangeably. Also, the terms "subscriber" and/or "user" are intended to be broadly interpreted to include a UE, or a user of a UE.

The term "component," as used herein, is intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

Figure 1:
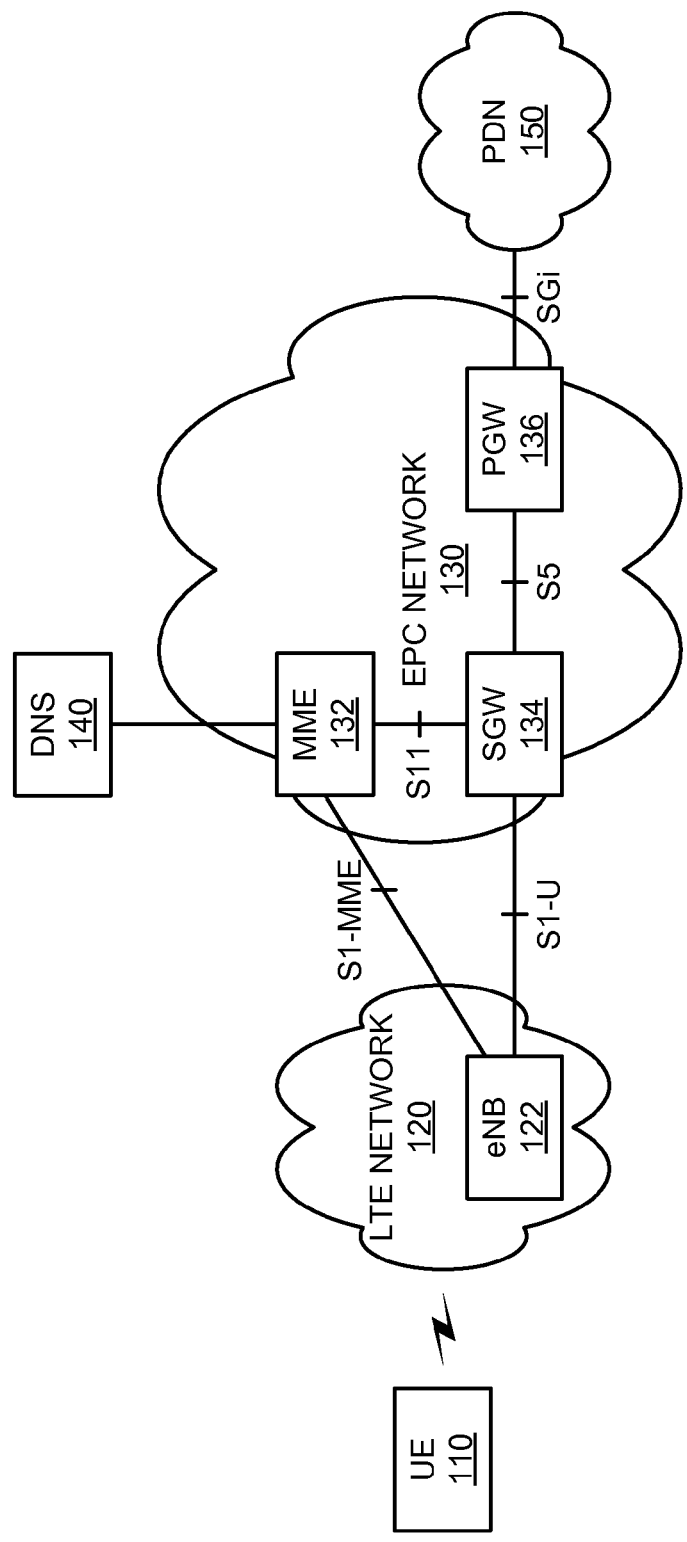
FIG. 1 is a diagram of an example network in which systems and/or methods described herein may be implemented.

FIG. 1 is a diagram of an example network 100 in which systems and/or methods described herein may be implemented. As illustrated, network 100 may include a UE 110; a LTE network 120 that includes an eNB 122; an EPC network 130 that includes a MME 132, a SGW 134, and a PGW 136; a DNS 140; and a PDN 150. Devices and/or networks of network 100 may interconnect via wired and/or wireless connections. A single UE 110, LTE network 120, eNB 122, EPC network 130, MME 132, SGW 134, PGW 136, DNS 140, and PDN 150 have been illustrated in FIG. 1 for simplicity. In practice, there may be more UEs 110, LTE networks 120, eNBs 122, EPC networks 130, MMEs 132, SGWs 134, PGWs 136, DNSs 140, and/or PDNs 150. As further shown in FIG. 1, eNB 122 may interface with MME 132 over a S1-MME interface, and may interface with SGW 134 over a S1-U interface. MME 132 may interface with SGW 134 over a S11 interface. SGW 134 may interface with PGW 136 over a S5 interface. PGW 136 may interface with PDN 150 over a SGi interface.

UE 110 may include a radiotelephone; a personal communications system (PCS) terminal that may combine, for example, a cellular radiotelephone with data processing and data communications capabilities; a smart phone; a personal digital assistant (PDA) that can include a radiotelephone, a pager, Internet/intranet access, etc.; a laptop computer; a tablet computer; or other types of computation and/or communication devices. In one example, UE 110 may include a device that is capable of communicating with EPC network 130 via eNB 120.

LTE network 120 may include a communications network that connects subscribers (e.g., UEs 110) to a service provider. In one example, LTE network 120 may include a WiFi network (e.g., using IEEE 802.11 standards) or other access networks (e.g., an E-UTRAN or an enhanced high-rate packet data (eHRPD) network). In another example, LTE network 120 may include a radio access network capable of supporting high data rate, low latency, packet optimization, large capacity and coverage, etc.

eNB 122 may include one or more computation and/or communication devices that receive voice and/or data from MME 132 and/or SGW 134 and wirelessly transmit that voice and/or data to UE 110. eNB 122 may also include one or more devices that wirelessly receive voice and/or data from UE 110 and transmit that voice and/or data to one of MME 132 and/or SGW 134 or to other UEs 110. eNB 122 may combine the functionalities of a base station and a radio network controller (RNC) in second generation (2G) or third generation (3G) radio access networks.

EPC network 130 may include core network architecture of the 3GPP LTE wireless communication standard. In one example, EPC network 130 may include an all-IP packet-switched core network that supports high-speed wireless and wireline broadband access technologies. In another example, EPC network 130 may provide packet-switched voice services (e.g., which are traditionally circuit-switched).

MME 132 may include one or more computation and/or communication devices that may be responsible for idle mode tracking and paging procedures (e.g., including retransmissions) for UE 110. MME 132 may be involved in a bearer activation/deactivation process (e.g., for UE 110), may choose a SGW for UE 110 at an initial attach and at a time of intra-LTE handover, and may authenticate UE 110. Non-access stratum (NAS) signaling may terminate at MME 132 and MME 132 may generate and allocate temporary identities to UE 110. MME 132 may check authorization of UE 110 to camp on a service provider's PLMN and may enforce roaming restrictions for UE 110. MME 132 may be a termination point in EPC network 130 for ciphering/integrity protection for NAS signaling and may handle security key management. MME 132 may provide a control plane function for mobility between LTE and access networks.

SGW 134 may include one or more traffic transfer devices (or network devices), such as a gateway, a router, a switch, a firewall, a network interface card (NIC), a hub, a bridge, a proxy server, an optical add-drop multiplexer (OADM), or some other type of device that processes and/or transfers traffic. In one example implementation, SGW 134 may route and forward user data packets, may act as a mobility anchor for a user plane during inter-eNB handovers, and may act as an anchor for mobility between LTE and other 3GPP technologies. For an idle state UE 110, SGW 134 may terminate a downlink (DL) data path and may trigger paging when DL data arrives for UE 110. SGW 134 may manage and store contexts associated with UE 110 (e.g., parameters of an IP bearer service, network internal routing information, etc.).

PGW 136 may include one or more traffic transfer devices (or network devices), such as a gateway, a router, a switch, a firewall, a NIC, a hub, a bridge, a proxy server, an OADM, or some other type of device that processes and/or transfers traffic. In one example implementation, PGW 136 may provide connectivity of UE 110 to external PDNs (e.g., PDN 150) by being a traffic exit/entry point for UE 110. UE 110 may simultaneously connect to more than one PGW 136 for accessing multiple PDNs 150. PGW 136 may perform policy enforcement, packet filtering for each user, charging support, lawful intercept, and packet screening. PGW 136 may also act as an anchor for mobility between 3GPP and non-3GPP technologies.

DNS 140 may include one or more server devices, or other types of computation and/or communication devices, that gather, process, search, and/or provide information in a manner described herein. In one example implementation, DNS 140 may include a hierarchical naming system for computers, services, and/or any resource participating in a network, such as the Internet. DNS 140 may associate various information with domain names assigned to each participant, and may translate domain names meaningful to humans into numerical (e.g., binary) identifiers associated with network devices for purposes of locating and addressing these devices worldwide.

PDN 150 may include a local area network (LAN), a wide area network (WAN), a metropolitan area network (MAN), a telephone network, such as the Public Switched Telephone Network (PSTN), an intranet, the Internet, an optical fiber (or fiber optic)-based network, or a combination of networks. In one example PDN 150 may include a network that breaks up a message (e.g., information) into packets for transmission. Unlike a circuit switching network, which requires establishment of a dedicated point-to-point connection, each packet in PDN 150 may include a destination address. Thus, all packets in a single message may not travel the same path. As traffic conditions change in PDN 150, the packets may be dynamically routed via different paths in PDN 150, and the packets may even arrive out of order. A destination device in PDN 150 may reassemble the packets into their proper sequence.

Although FIG. 1 shows example devices/networks of network 100, in other implementations, network 100 may include fewer devices/networks, different devices/networks, differently arranged devices/networks, or additional devices/networks than depicted in FIG. 1. Alternatively, or additionally, one or more devices/networks of network 100 may perform one or more other tasks described as being performed by one or more other devices/networks of network 100.

Figure 2:
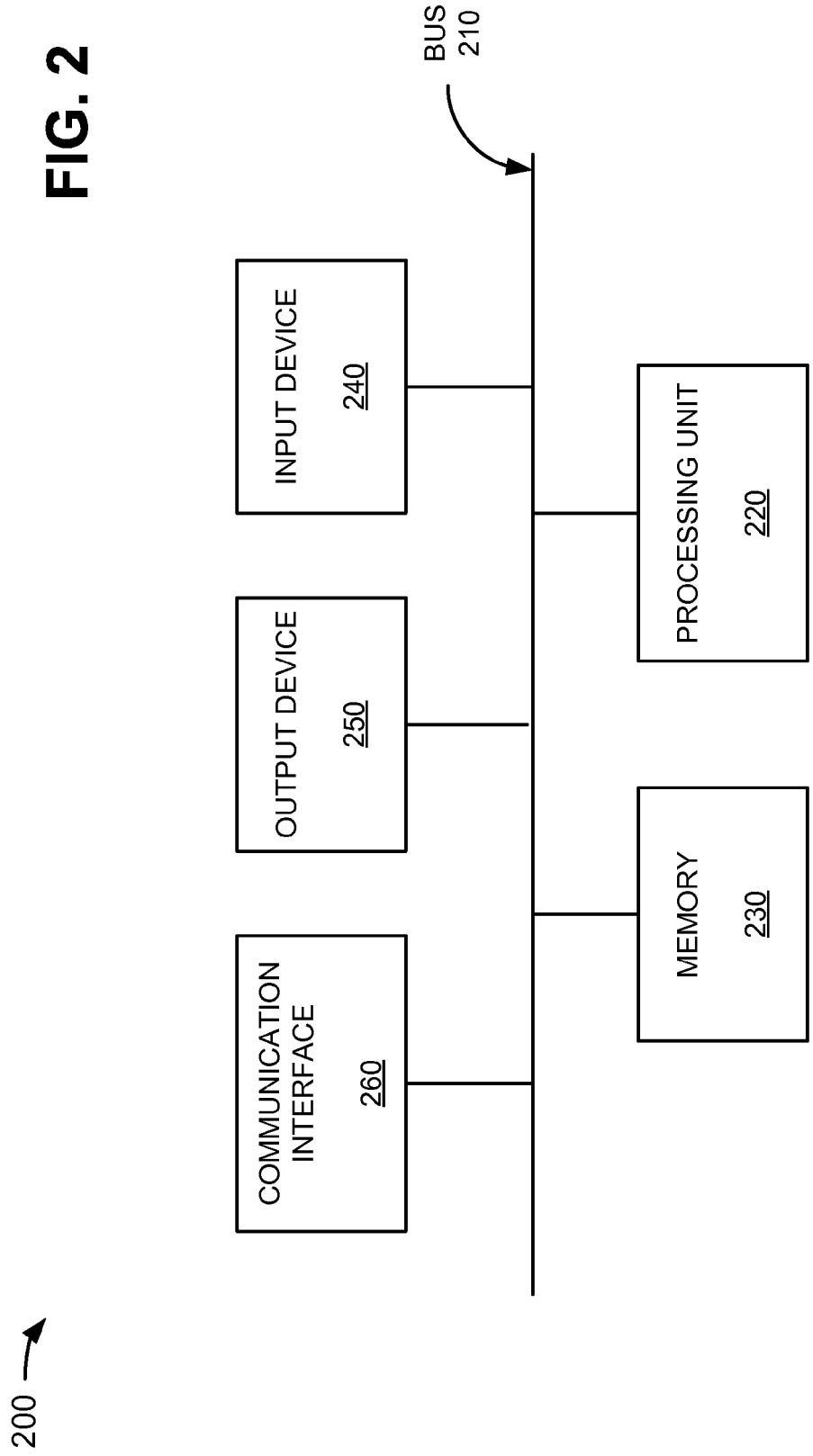
FIG. 2 is a diagram of example components of a device that may correspond to one of the devices of the network depicted in FIG. 1.

FIG. 2 is a diagram of example components of a device 200 that may correspond to one or more devices of network 100 (FIG. 1). In one example implementation, one or more of the devices of network 100 may include one or more devices 200 or one or more components of device 200. As illustrated in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more ASICs, FPGAs, or the like.

Memory 230 may include a RAM or another type of dynamic storage device that stores information and instructions for execution by processing unit 220, a ROM or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, a touch screen display, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 260 may include mechanisms for communicating with other devices, such as other devices of network 100.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, or additionally, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

Figure 3:
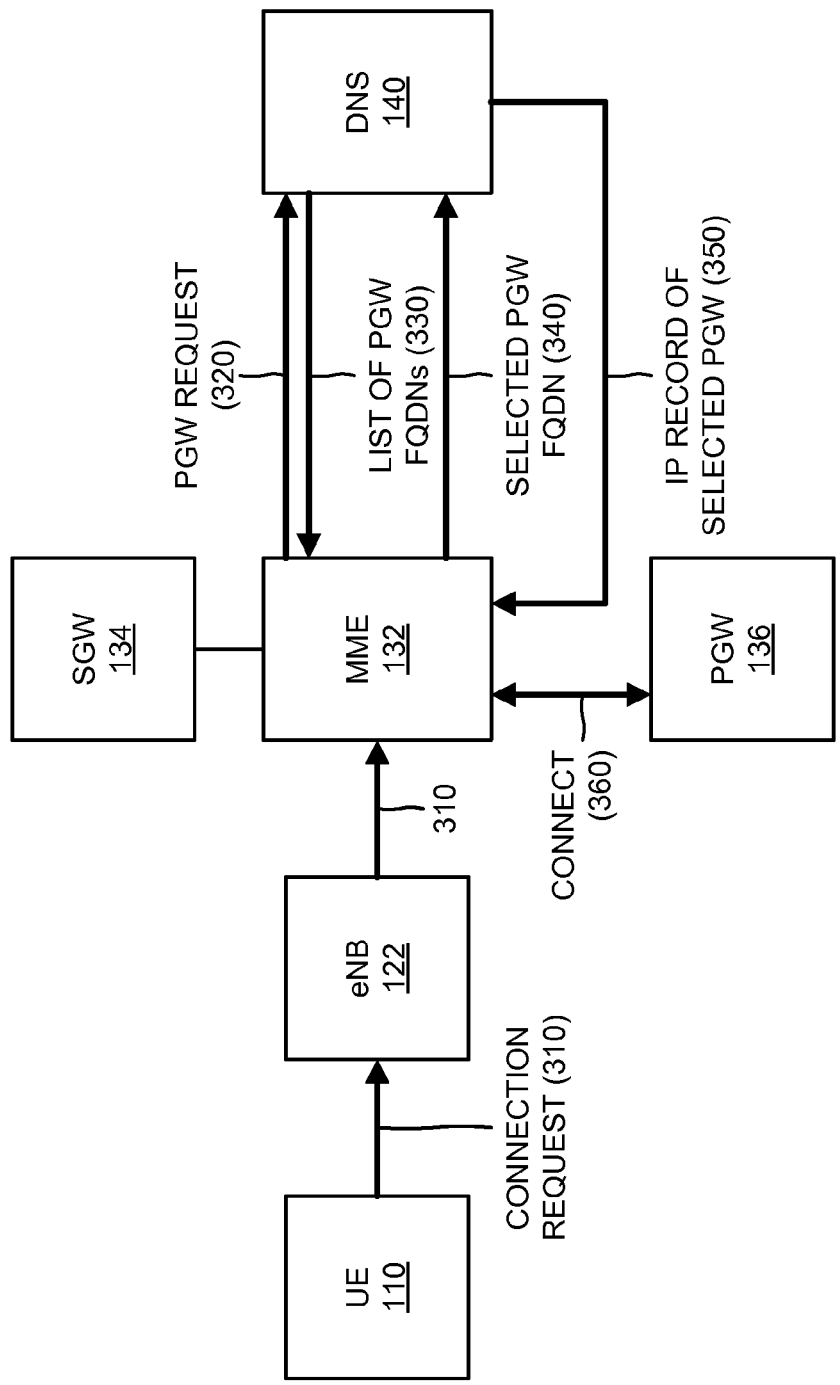
FIG. 3 is a diagram of example operations capable of being performed by an example portion of the network in FIG. 1.

FIG. 3 is a diagram of example operations capable of being performed by an example portion 300 of network 100 (FIG. 1). As shown, network portion 300 may include UE 110, eNB 122, MME 132, SGW 134, PGW 136, and DNS 140. UE 110, eNB 122, MME 132, SGW 134, PGW 136, and DNS 140 may include the features described above in connection with, for example, one or more of FIGS. 1 and 2.

As further shown in FIG. 3, UE 110 may generate a connection request 310 to connect to EPC network 130 (not shown), and may provide connection request 310 to eNB 122. eNB 122 may receive connection request 310, and may provide connection request 310 to MME 132. MME 132 may receive connection request 310, and may determine optimal network nodes (e.g., SGW 134 and PGW 136) to which to route a communication session of UE 110 based on connection request 310.

For example, in order to determine an optimal (e.g., a closest distance wise or a most appropriate) PGW to which to route the communication session of UE 110, MME 132 may provide a PGW request 320 to DNS 140. PGW request 320, in one example, may include a request for PGWs with access point names (APNs) that serve particular applications. DNS 140 may receive PGW request 320 and may determine a list 330 of FQDNs of PGWs with APNs that serve the particular applications identified in PGW request 320. DNS 140 may return list 330 of PGW FQDNs to MME 132.

MME 132 may receive list 330 of PGW FQDNs, and may store list 330 of PGW FQDNs in a buffer (e.g., memory 230, FIG. 2) provided in MME 132. However, as the number of PGWs in a network grows, list 330 of PGW FQDNs may also grow and the buffer may not be able to store all of the entries in list 330 of PGW FQDNs. To address this, MME 132 may truncate redundant information contained in the PGW FQDNs provided in list 330 in order to create a list of truncated PGW FQDNs. The list of truncated PGW FQDNs may include less information than list 330 of PGW FQDNs, and the buffer of MME 132 may be able to store the entire list of truncated PGW FQDNs in the buffer of MME 132.

MME 132 may select a truncated FQDN of a PGW (e.g., PGW 136) from the list of truncated PGW FQDNs. In one example, MME 132 may select, from the list of truncated PGW FQDNs, a PGW that is closest distance wise to UE 110. Alternatively, or additionally, MME 132 may select, from the list of truncated PGW FQDNs, a PGW that is most appropriate for UE 110 (e.g., based on the application(s) requested by UE 110 via connection request 310). MME 132 may restore a complete FQDN of the selected PGW 136. In other words, MME 132 may restore the redundant information removed by MME 132 from the FQDN of the selected PGW 136 during the truncation of list 330 of PGW FQDNs.

MME 132 may provide the restored FQDN of the selected PGW 136 to DNS 140, as indicated by reference number 340. DNS 140 may receive the restored FQDN of the selected PGW 136, and may determine an IP record 350 of PGW 136 based on the restored FQDN of the selected PGW 136. IP record 350 of PGW 136 may include an IP version 4 (IPv4) address of PGW 136 or an IP version 6 (IPv6) address of PGW 136. DNS 140 may provide IP record 350 of PGW 136 to MME 132, and MME 132 may receive IP record 350 of PGW 136. MME 132 may connect with the selected PGW 136 based on IP record 350, as indicated by reference number 360. The same operations described above with respect to determining an optimal PGW for connection request 310 may be applied to determining an optimal SGW for connection request 310.

Based on the determination of the optimal SGW 134 and the optimal PGW 136, MME 132 may route the communication session of UE 110 to SGW 134 and/or PGW 136. UE 110 may connect to SGW 134 and/or PGW 136. SGW 134 and/or PGW 136 may enable UE 110 to connect to EPC network 130 or other networks (e.g., PDN 150) and receive services from EPC network 130 or the other networks.

Although FIG. 3 shows example components of network portion 300, in other implementations, network portion 300 may include fewer components, different components, differently arranged components, or additional components than depicted in FIG. 3. Additionally, or alternatively, one or more components of network portion 300 may perform one or more other tasks described as being performed by one or more other components of network portion 300.

Figure 4:
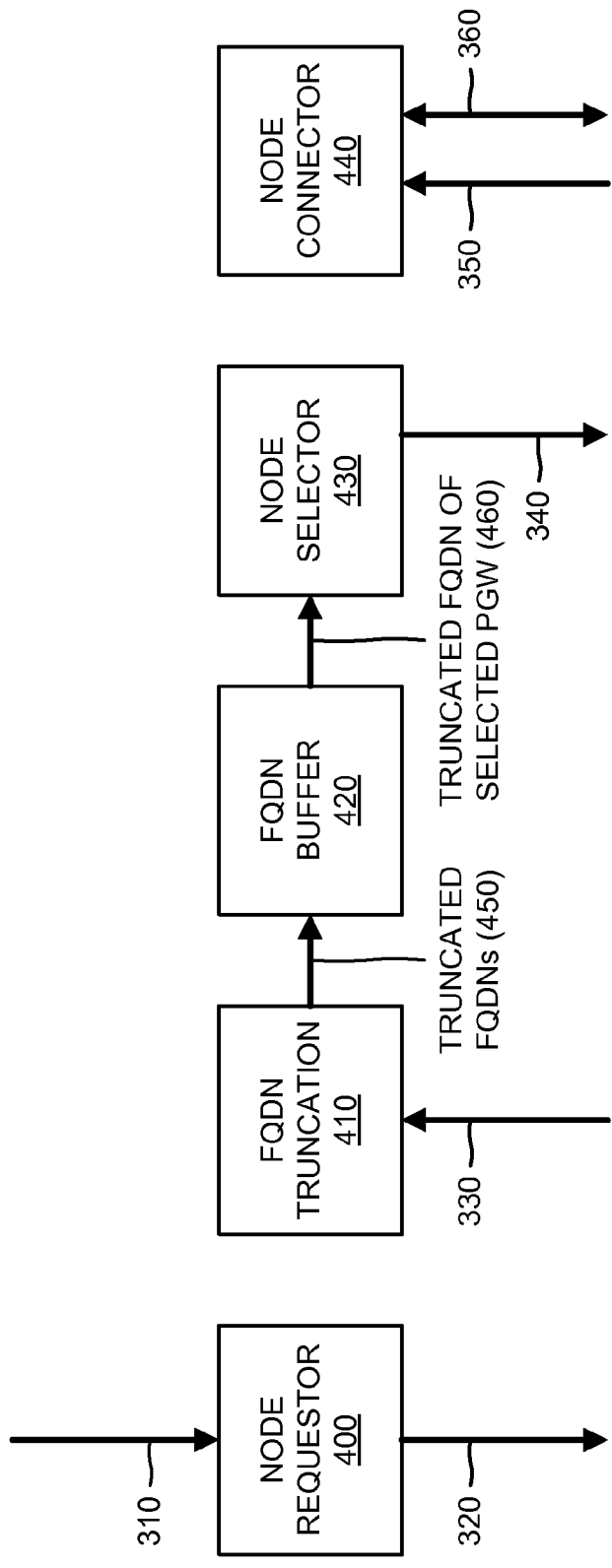
FIG. 4 is a diagram of example functional components of a MME of FIG. 1.

FIG. 4 is a diagram of example functional components of MME 132. In one implementation, the functions described in connection with FIG. 4 may be performed by one or more components of device 200 (FIG. 2) or by one or more devices 200. As shown in FIG. 4, MME 132 may include a node requestor component 400, a FQDN truncation component

410, a FQDN buffer 420, a node selector component 430, and a node connector component 440.

Node requestor component 400 may receive connection request 310 from eNB 122, and may enable MME 132 to determine optimal network nodes (e.g., SGW 134 and PGW 136) to which to route a communication session of UE 110 based on connection request 310. For example, to enable MME 132 to determine an optimal PGW to which to route the communication session of UE 110, node requestor component 400 may generate PGW request 320, and may provide PGW request 320 to DNS 140.

FQDN truncation component 410 may receive list 330 of PGW FQDNs from DNS 140, and may truncate redundant information contained in the PGW FQDNs provided in list 330 in order to create a list 450 of truncated PGW FQDNs. In one example, FQDN truncation component 410 may remove the domain portions of the PGW FQDNs provided in list 330. For example, FQDN truncation component 410 may remove the following syntax from the PGW FQDNS provided in list 330: "node.epc.mncXXX.mccXXX.3gppnetwork.org." Alternatively, or additionally, FQDN truncation component 410 may utilize other methods to truncate redundant information contained in the PGW FQDNs provided in list 330. For example, FQDN truncation component 410 may perform a table lookup for values that have a fixed number of known characters, and may remove the fixed number of known characters from the PGW FQDNs provided in list 330. In other examples, FQDN truncation component 410 may utilize Boolean logic and/or simple replacement to truncate redundant information contained in the PGW FQDNs provided in list 330. As further shown in FIG. 4, FQDN truncation component 410 may store list 450 of truncated PGW FQDNs in FQDN buffer 420.

FQDN buffer 420 may receive list 450 of truncated PGW FQDNs from FQDN truncation component 410, and may store list 450 of truncated PGW FQDNs. In one example, FQDN buffer 420 may correspond to memory 230 of FIG. 2. MME 132 may select a truncated FQDN of a PGW (e.g., PGW 136) from list 450 of truncated PGW FQDNs stored in FQDN buffer 420. In one example, MME 132 may select, from list 450 of truncated PGW FQDNs, a PGW that is closest to UE 110. Alternatively, or additionally, MME 132 may select, from list 450 of truncated PGW FQDNs, a PGW that is most appropriate for UE 110 (e.g., based on the application(s) requested by UE 110 via connection request 310). As further shown in FIG. 4, FQDN buffer 420 may provide a truncated FQDN 460 of the selected PGW to node selector component 430.

Node selector component 430 may receive truncated FQDN 460 of the selected PGW, and may restore a complete FQDN of truncated FQDN 460 of the selected PGW. In other words, node selector component 430 may restore the redundant information removed by FQDN truncation component 410 from the FQDN of the selected PGW during the truncation of list 330 of PGW FQDNs. Node selector component 430 may provide the restored FQDN of the selected PGW to DNS 140, as indicated by reference number 340.

Node connector component 440 may receive IP record 350 of the selected PGW from DNS 140. Node connector component 440 may connect MME 132 with the selected PGW based on IP record 350, as indicated by reference number 360. Based on the selection of the PGW, MME 132 may route the communication session of UE 110 to the selected PGW, and UE 110 may connect to the selected PGW.

Although FIG. 4 shows example functional components of MME 132, in other implementations, MME 132 may include fewer functional components, different functional components, differently arranged functional components, or additional functional components than depicted in FIG. 4. Additionally, or alternatively, one or more functional components of MME 132 may perform one or more other tasks described as being performed by one or more other functional components of MME 132.

Figure 5:
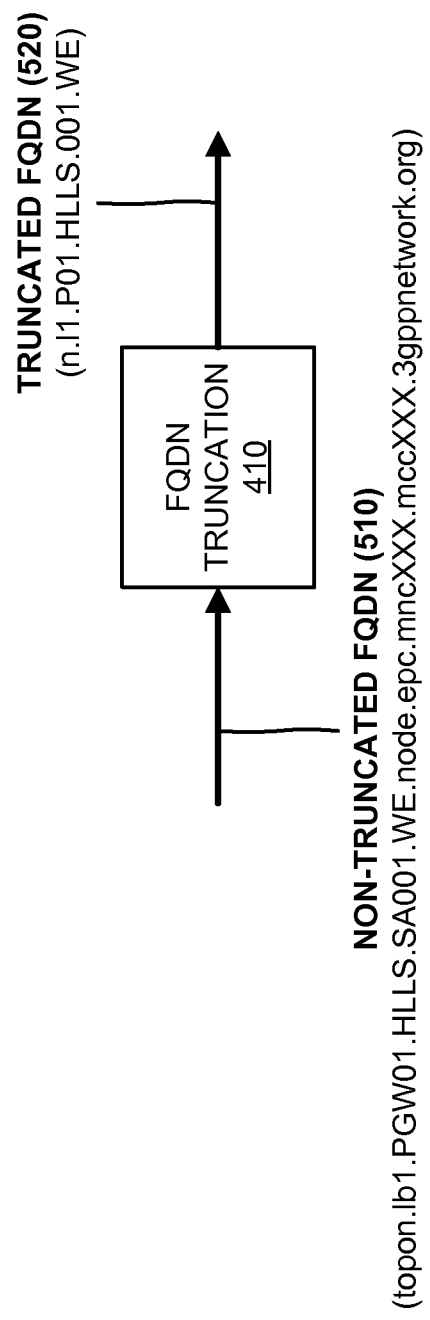
FIG. 5 is a diagram of example operations capable of being performed by a FQDN truncation component of FIG. 4.

FIG. 5 is a diagram of example operations 500 capable of being performed by FQDN truncation component 410 (FIG. 4). In one implementation, the functions described in connection with FIG. 5 may be performed by one or more components of device 200 (FIG. 2) or by one or more devices 200. FQDN truncation component 410 may include the features described above in connection with, for example, FIG. 4.

As further shown in FIG. 5, FQDN truncation component 410 may receive a non-truncated FQDN record 510. In one example, non-truncated FQDN record 510 may be part of list 330 of PGW FQDNs, and may include the following syntax:
topon.lb1.PGW01.HLLS.SA001.WE.node.epc.mncXXX.mccXXX.3gppnetwork.org. FQDN truncation component 410 may truncate redundant information contained in non-truncated FQDN record 510 in order to create a truncated FQDN record 520. In one example, FQDN truncation component 410 may remove the domain portion of non-truncated FQDN record 510. Alternatively, or additionally, FQDN truncation component 410 may utilize a table lookup, Boolean logic, and/or simple replacement to truncate redundant information contained in non-truncated FQDN record 510. Truncated FQDN record 520, in one example, may include the following syntax: "n.11.P01.HLLS.001.WE."

Although FIG. 5 shows example operations 500 capable of being performed by FQDN truncation component 410, in other implementations, FQDN truncation component 410 may perform fewer operations, different operations, or additional operations than described in connection with FIG. 5.

Figure 6:
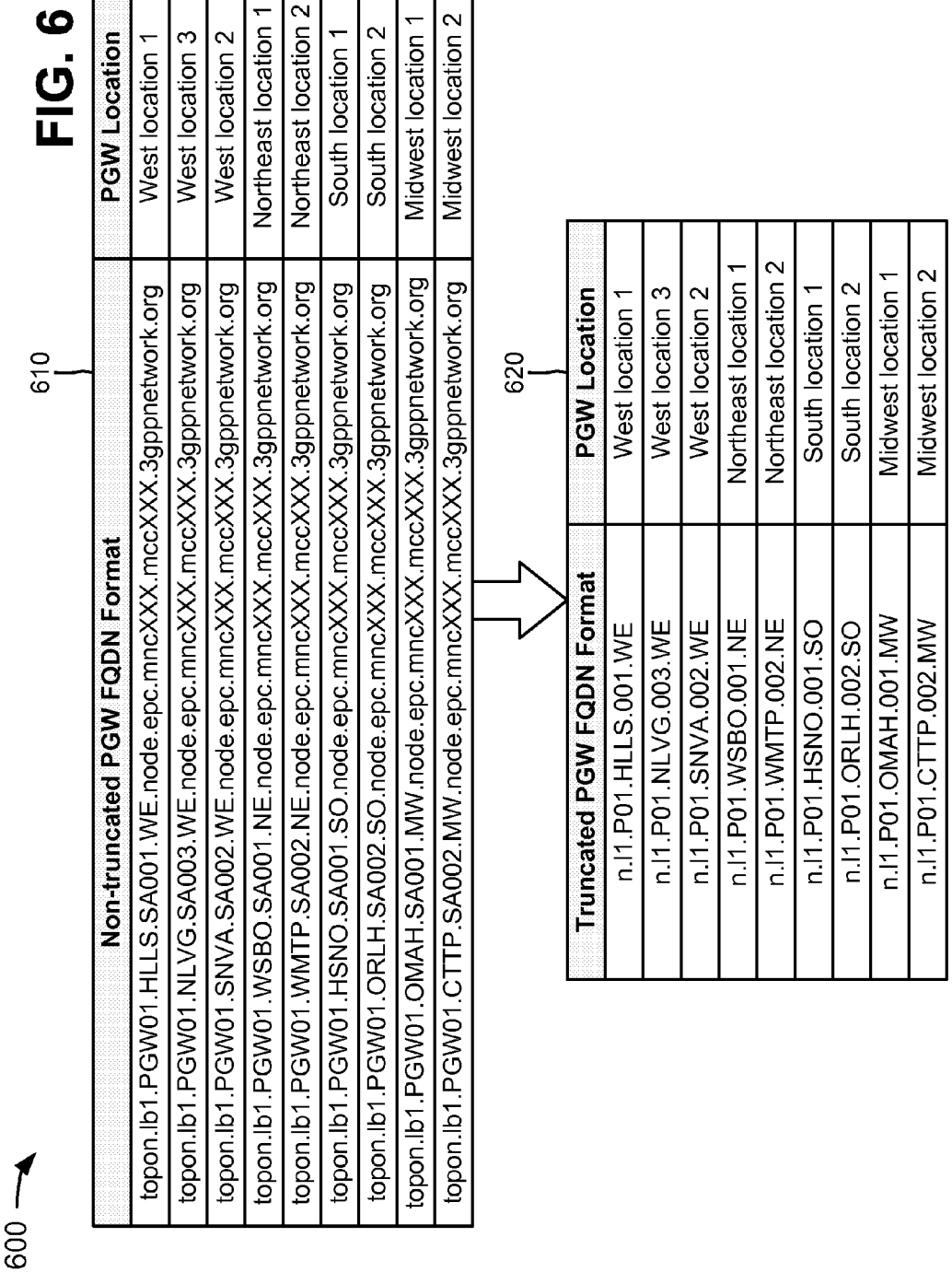
FIG. 6 is a diagram of example truncations capable of being performed by the FQDN truncation component of FIG. 4.

FIG. 6 is a diagram of example truncations 600 capable of being performed by FQDN truncation component 410 (FIG. 4). In one implementation, the functions described in connection with FIG. 6 may be performed by one or more components of device 200 (FIG. 2) or by one or more devices 200. FQDN truncation component 410 may include the features described above in connection with, for example, one or more of FIGS. 4 and 5.

As shown in FIG. 6, FQDN truncation component 410 may truncate redundant information contained in a list 610 of non-truncated PGW FQDNs in order to create a list 620 of truncated PGW FQDNs. In one example, list 610 of non-truncated PGW FQDNs may correspond to list 330 of PGW FQDNs, and list 620 of truncated PGW FQDNs may correspond to list 450 of truncated PGW FQDNs. As shown, FQDN truncation component 410 may remove the following domain syntax from the non-truncated PGW FQDNs provided in list 610: "node.epc.mncXXX.mccXXX.3gppnetwork.org." FQDN truncation component 410 may also remove the following redundant characters from the non-truncated PGW FQDNs provided in list 610: "opon," "b," "GW," and "SA."

As further shown in FIG. 6, the non-truncated PGW FQDNs provided in list 610 and the truncated PGW FQDNs provided in list 620 may each correspond to a location of a corresponding PGW. For example, the truncated PGW FQDN "n.11.P01.HLLS.001. WE" may correspond to a PGW located at a first West location, the truncated PGW FQDN "n.11.P01.NLVG.003.WE" may correspond to a PGW located at a third West location, etc.

Although FIG. 6 shows example truncations 600 capable of being performed by FQDN truncation component 410, in other implementations, FQDN truncation component 410 may perform fewer truncations, different truncations, or additional truncations than described in connection with FIG. 6.

Figure 7:
FIGS. 7 and 8 are flow charts of an example process for performing FQDN record optimization for network node selection according to an implementation described herein.
Figure 8:
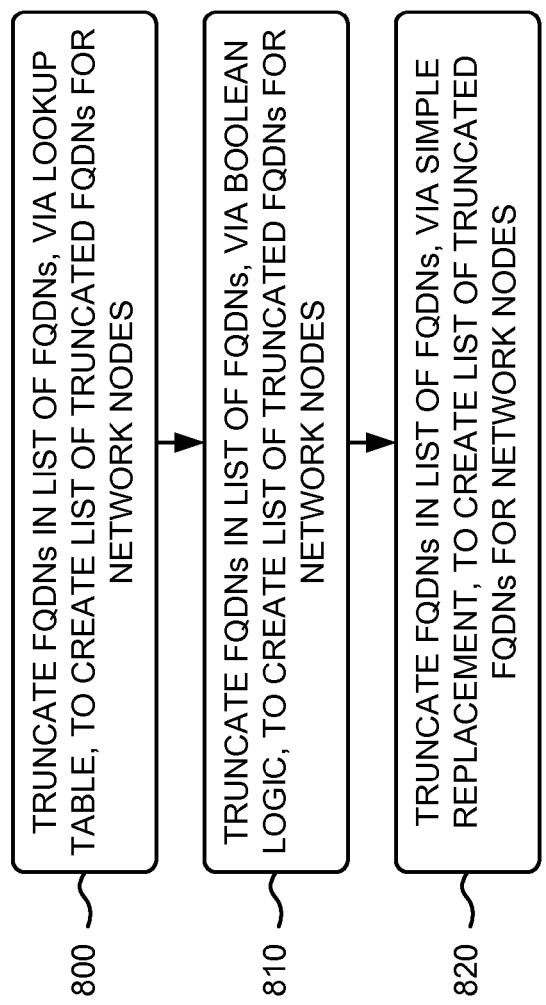

FIGS. 7 and 8 are flow charts of an example process 700 for performing FQDN record optimization for network node selection according to an implementation described herein. In one implementation, process 700 may be performed by MME 132. Alternatively, or additionally, some or all of process 700 may be performed by another device or group of devices, including or excluding MME 132.

As shown in FIG. 7, process 700 may include providing a request for candidate network nodes to a DNS (block 710), receiving, from the DNS and based on the request, a list of FQDNs for network nodes (block 720), and truncating the FQDNs in the list of FQDNs to create a list of truncated FQDNs for the network nodes (block 730). For example, in an implementation described above in connection with FIG. 3, in order to determine an optimal (e.g., a closest distance wise or a most appropriate) PGW to which to route the communication session of UE 110, MME 132 may provide PGW request 320 to DNS 140. PGW request 320, in one example, may include a request for PGWs with APNs that serve particular applications. DNS 140 may determine list 330 of FQDNs of PGWs with APNs that serve the particular applications identified in PGW request 320, and may return list 330 of PGW FQDNs to MME 132. MME 132 may receive list 330 of PGW FQDNs, and may truncate redundant information contained in the PGW FQDNs provided in list 330 in order to create a list of truncated PGW FQDNs.

As further shown in FIG. 7, process 700 may include storing the list of truncated FQDNs in a buffer (block 740), selecting a network node truncated FQDN from the list of truncated FQDNs (block 750), and restoring the FQDN of the selected network node truncated FQDN (block 770). For example, in an implementation described above in connection with FIG. 3, MME 132 may store the entire list of truncated PGW FQDNs in the buffer of MME 132. MME 132 may select a truncated FQDN of a PGW (e.g., PGW 136) from the list of truncated PGW FQDNs. In one example, MME 132 may select, from the list of truncated PGW FQDNs, a PGW that is closest to UE 110, a PGW that is most appropriate for UE 110, etc. MME 132 may restore a complete FQDN of the selected PGW 136. In other words, MME 132 may restore the redundant information removed by MME 132 from the FQDN of the selected PGW 136 during the truncation of list 330 of PGW FQDNs.

Returning to FIG. 7, process 700 may include providing the restored FQDN of the selected network node to the DNS (block 770), receiving, from the DNS, an IP record of the selected network node based on the restored FQDN (block 780), and connecting with the selected network node based on the received IP record (block 790). For example, in an implementation described above in connection with FIG. 3, MME 132 may provide the restored FQDN of the selected PGW 136 to DNS 140, as indicated by reference number 340. DNS 140 may receive the restored FQDN of the selected PGW 136, and may determine IP record 350 of PGW 136 based on the restored FQDN of the selected PGW 136. DNS 140 may provide IP record 350 of PGW 136 to MME 132, and MME 132 may receive IP record 350 of PGW 136. MME 132 may connect with the selected PGW 136 based on IP record 350, as indicated by reference number 360.

Process block 730 may include the process blocks depicted in FIG. 8. As shown in FIG. 8, process block 730 may include truncating the FQDNs in the list of FQDNs, via a table lookup, to create the list of truncated FQDNs for the network nodes (block 800), truncating the FQDNs in the list of FQDNs, via Boolean logic, to create the list of truncated FQDNs for the network nodes (block 810), and/or truncating the FQDNs in the list of FQDNs, via simple replacement, to create the list of truncated FQDNs for the network nodes (block 820). For example, in an implementation described above in connection with FIG. 4, FQDN truncation component 410 of MME 132 may utilize other methods to truncate redundant information contained in the PGW FQDNs provided in list 330. In one example, FQDN truncation component 410 may perform a table lookup for values that have a fixed number of known characters, and may remove the fixed number of known characters from the PGW FQDNS provided in list 330. In other examples, FQDN truncation component 410 may utilize Boolean logic and/or simple replacement to truncate redundant information contained in the PGW FQDNs provided in list 330.

Systems and/or methods described herein may provide FQDN record optimization for selection of network nodes, such as LTE network nodes (e.g., a MME, a SGW, a PGW, etc.). The systems and/or methods may truncate redundant information included the FQDN records before storing the FQDN in a buffer. This may enable the systems and/or methods to store more FQDN records, which may increase a number of network nodes from which the systems and/or methods may select for communication sessions with UEs.

The foregoing description of implementations provides illustration and description, but is not intended to be exhaustive or to limit the implementations to the precise form disclosed. Modifications and variations are possible in light of the above teachings or may be acquired from practice of the implementations.

For example, while series of blocks have been described with regard to FIGS. 7 and 8, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   providing, by a device and to a domain name system (DNS), a request for candidate network nodes to which to connect;

receiving, by the device and from the DNS based on the request, a list of fully qualified domain names (FQDNs) for the candidate network nodes;
truncating, by the device, the FQDNs to shorten the FQDNs in the list of FQDNs to create a list of truncated FQDNs corresponding to the candidate network nodes, wherein a number of truncated FQDNs in the list of truncated FQDNs is equal to a number of FQDNs in the list of FQDNs before the truncating;
storing, by the device, the list of truncated FQDNs in a buffer associated with the device;
selecting a network node truncated FQDN from the list of truncated FQDNs;
restoring a FQDN of the selected network node truncated FQDN to create a non-truncated FQDN;
providing, to the DNS, the restored FQDN of the selected network node;
receiving, from the DNS and based on the restored FQDN, an Internet protocol (IP) record of the selected network node; and
connecting the device with the selected network node based on received IP record.

2. The method of claim 1, where truncating the FQDNs in the list of FQDNs comprises:
removing domain portions of the FQDNs in the list of FQDNs.

3. The method of claim 1, where truncating the FQDNs in the list of FQDNs comprises:
removing redundant information of the FQDNs in the list of FQDNs.

4. The method of claim 1, where truncating the FQDNs in the list of FQDNs comprises one or more of:
truncating, via a table lookup, the FQDNs in the list of FQDNs to create the list of truncated FQDNs corresponding to the candidate network nodes;
truncating, via Boolean logic, the FQDNs in the list of FQDNs to create the list of truncated FQDNs corresponding to the candidate network nodes; or
truncating, via replacement, the FQDNs in the list of FQDNs to create the list of truncated FQDNs corresponding to the candidate network nodes.

5. The method of claim 1, where the candidate network nodes include long term evolution (LTE) network nodes.

6. The method of claim 5, where each of the LTE network nodes includes one of:
a serving gateway (SGW), or
a packet data network (PDN) gateway (PGW).

7. A device, comprising:
a memory; and
a processor to:
provide, to a domain name system (DNS), a request for candidate network nodes to which to connect,
receive, from the DNS and based on the request, a list of fully qualified domain names (FQDNs) corresponding to the candidate network nodes,
truncate the FQDNs to shorten the FQDNs in the list of FQDNs to create a list of truncated FQDNs corresponding to the candidate network nodes, wherein a number of truncated FQDNs in the list of truncated FQDNs is equal to a number of FQDNs in the list of FQDNs before the truncating,
store the list of truncated FQDNs in the memory, where the list of FQDNs corresponding to the candidate network nodes encompasses more memory space than the list of truncated FQDNs corresponding to the candidate network nodes,
select a network node truncated FQDN from the list of truncated FQDNs based on distances of the candidate network nodes to a user equipment connected to the device,
restore a FQDN of the selected network node truncated FQDN to create a non-truncated FQDN,
provide, to the DNS, the restored FQDN of the selected network node,
receive, from the DNS and based on the restored FQDN, an Internet protocol (IP) record of the selected network node, and
connect the device with the selected network node based on received IP record.

8. The device of claim 7, where the device comprises a mobility management entity (MME).

9. The device of claim 7, where, when truncating the FQDNs in the list of FQDNs, the processor is further to:
remove domain portions of the FQDNs in the list of FQDNs.

10. The device of claim 7, where, when truncating the FQDNs in the list of FQDNs, the processor is further to:
remove redundant information of the FQDNs in the list of FQDNs.

11. The device of claim 7, where, when truncating the FQDNs in the list of FQDNs, the processor is further to one or more of:
truncate, via a table lookup, the FQDNs in the list of FQDNs to create the list of truncated FQDNs corresponding to the candidate network nodes,
truncate, via Boolean logic, the FQDNs in the list of FQDNs to create the list of truncated FQDNs corresponding to the candidate network nodes, or
truncate, via replacement, the FQDNs in the list of FQDNs to create the list of truncated FQDNs corresponding to the candidate network nodes.

12. The device of claim 7, where the candidate network nodes include long term evolution (LTE) network nodes.

13. The device of claim 12, where each of the LTE network nodes includes one of:
a serving gateway (SGW), or
a packet data network (PDN) gateway (PGW).

14. A non-transitory computer-readable medium, comprising:
one or more instructions that, when executed by a processor of a device, cause the processor to:
provide, to a domain name system (DNS), a request for candidate network nodes to which to connect with the device,
receive, from the DNS and based on the request, a list of fully qualified domain names (FQDNs) corresponding to the candidate network nodes,
truncate the FQDNs to shorten the FQDNs in the list of FQDNs to create a list of truncated FQDNs corresponding to the candidate network nodes, wherein a number of truncated FQDNs in the list of truncated FQDNs is equal to a number of FQDNs in the list of FQDNs before the truncating,
store the list of truncated FQDNs in a buffer associated with the device,
select a network node truncated FQDN from the list of truncated FQDNs,
restore a FQDN of the selected network node truncated FQDN to create a non-truncated FQDN,
provide, to the DNS, the restored FQDN of the selected network node, receive, from the DNS and based on the restored FQDN, an Internet protocol (IP) record of the selected network node, and connect the device with the selected network node based on received IP record.

15. The computer-readable medium of claim 14, where the truncating the FQDNs in the list of FQDNs includes removing domain portions of the FQDNs in the list of FQDNs.

16. The computer-readable medium of claim 14, where the truncating the FQDNs in the list of FQDNs includes removing redundant information of the FQDNs in the list of FQDNs.

17. The computer-readable medium of claim 14, where the truncating the FQDNs in the list of FQDNs is performed via one or more of a table lookup, Boolean logic, or replacement.

18. The computer-readable medium of claim 14, where the candidate network nodes include long term evolution (LTE) network nodes.

19. The computer-readable medium of claim 18, where each of the LTE network nodes includes one of:
   a serving gateway (SGW), or
   a packet data network (PDN) gateway (PGW).

20. The computer-readable medium of claim 14, further comprising:
   one or more instructions that, when executed by the processor, cause the processor to:
      route a communication session of a user equipment to the selected network node, where the selected network node enables the user equipment to connect to a network.

21. The computer-readable medium of claim 14, where the device comprises a mobility management entity (MME).

* * * * *